United States Patent [19]

Fiegel et al.

[11] Patent Number: 5,797,648
[45] Date of Patent: Aug. 25, 1998

[54] ROOF, HATCH, PARTICULARLY IN INTENDED FOR VEHICLE ROOFS

[75] Inventors: Gunnar Fiegel, Starnberg; Ulf Plettrichs, Hattenhofen; Alexander Walter, Munich; Thomas Schröferl, Hofenschäftlarn; Hossein Soltanmoradi, Gauting, all of Germany

[73] Assignee: Webasto Thermosysteme GmbH, Stockdorf, Germany

[21] Appl. No.: 625,138

[22] Filed: Apr. 1, 1996

Related U.S. Application Data

[63] Continuation of PCT/EP94/03273 Sep. 30, 1994 published as WO95/09739 Apr. 13, 1995.

[30] Foreign Application Priority Data

Oct. 1, 1993 [DE] Germany ............ 43 33 514.4

[51] Int. Cl.[6] ........................................... B60J 7/057
[52] U.S. Cl. ................................ 296/223; 296/224
[58] Field of Search ........................ 296/216, 223, 296/224

[56] References Cited

U.S. PATENT DOCUMENTS 4,754,695  7/1988  Kovacic .

FOREIGN PATENT DOCUMENTS

| 0 308 849 | 3/1989 | European Pat. Off. |
| 0 325 380 | 6/1991 | European Pat. Off. |
| 0 451 583 | 10/1991 | European Pat. Off. |
| 35 03 806 | 8/1986 | Germany . |
| 38 35 108 | 4/1990 | Germany . |
| 4212625 | 8/1992 | Japan ............ 296/216 |

*Primary Examiner*—Dennis H. Pedder
*Attorney, Agent, or Firm*—Sixbey, Friedman, Leedom & Ferguson, P.C.; David S. Safran

[57] ABSTRACT

A roof hatch, particularly to a roof hatch intended for vehicle roofs. The roof hatch has a cover, which, for exposing a roof opening defined by a frame in a fixed roof surface, is alternately, or also, simultaneously, tiltable at two opposite sides. In order to facilitate a low-friction and low-loss actuation with minor force, the push rods actuating the extension devices, in accordance with the invention, are pivotally supported with one end, and with their other ends are guided in cam surfaces of a driven cam disk which is centrally supported on the inner side of the cover, and are additionally guided in guideways fixed to the cover, which essentially have circular shape.

16 Claims, 6 Drawing Sheets

ROOF, HATCH, PARTICULARLY INTENDED FOR VEHICLE ROOFS

CROSS REFERENCE TO RELATED APPLICATION

This application is a continuation of co-pending International Patent Application No. PCT/EP94/03273 filed Sep. 30, 1994, and designating the United States.

BACKGROUND OF THE INVENTION

1. Field of the Invention

The present invention relates to a roof hatch, particularly a roof hatch intended for vehicle roofs, having a frame in a fixed roof whose inner edge defines a roof opening which, selectively, can be opened or closed by a cover, by actuating tilting devices which support two opposite sides of the cover, respectively. More specifically, to such a roof hatch in which the tilting devices which are engaged by pushrods that are actuated by a cam disk that is rotatably supported and centrally located at the underside of the cover, and which has at least two cam surfaces.

2. Description of Related Art

A roof hatch of type to which the present invention is directed is known from German Patent 40 11 903 C1, where the pushrods, respectively, acting upon an extension device via a sliding element, displaceably supported at the cover, perform a longitudinal movement exclusively. To this end, the pushrods are guided in guideways, via pins arranged therein, which extend in the cam disk over a circumferential angle of about 270°. The fact that the pushrods are actuated directly by the effects of the varying radii of intertwined cam surfaces, results in a requirement for very high actuating forces for the extension of this roof hatch, and moreover, the cam surfaces and pins of the pushrods guided therein are subject to increased wear. Additionally, the arrangement of two intertwined cam surfaces on a cam disk which, respectively, assume a circumferential angle of 270°, presents difficulties. The cam surfaces in certain areas get too close to each other, causing the material strength of the cam disk remaining between them to be low, and also, causing the material at such points of heavy stress to tend to break at times.

SUMMARY OF THE INVENTION

It is a primary objective of the present invention to provide a roof hatch whose tilting devices can be operated with low actuating forces and a with low degree of wear.

This objective and others are achieved in accordance with the present invention by one end of the pushrods being pivotally supported at the tilting devices, and the other ends of the pushrods engaging the cam surfaces. Additionally, the ends of the pushrods which engage the cam surfaces are also guided in guideways, which essentially are circular, that are fixed at the underside of the cover. The provision of fixedly arranged guideways, in addition to the cam surfaces at the cover, results in an optimal transfer of the power introduced into the cam disk onto the pushrods. Based on the essentially circular configuration of the guideways, the wear thereon is substantially lower than with guideways with constantly changing radii and correspondingly curved transition areas.

In one advantageous development of the invention, the guideway for one pushrod is approximately semicircular, and the guideway for the other pushrod is approximately quadrantal. This configuration serves, on one hand, to ensure that there is sufficient material remaining between the guideways, and on the other hand, provides the basis for an alternating or simultaneous tilting of the two tilting devices at a rotational angle of the cam disk of only 180°; thereby substantially simplifying the actuation of the inventive roof hatch.

It is further advantageous if the opposite ends of the guideways, each have a section which is radially inwardly directed with respect to the rotational axis of the cam disk. These radially inwardly directed sections, in cooperation with the cam surfaces on the cam disk, facilitate a simple mutual locking in the closed position. In this connection, advantageously, the cam surfaces each have a section which comprises a radial and a tangential component, with the section's radial extension corresponding to the length of the radial sections at the guideways. By means of these segments, comprising a radial and a tangential component at the cam surfaces, the pins disposed on the pushrods can be moved in and out of the radial sections at the guideways with low energy expenditure. In a particularly advantageous feature of the invention, one of the cam surfaces consists only of this above-designated section having a radial and a tangential component, while the other cam surface, additionally, has a part which is approximately quadrantal.

To facilitate a simplified manufacture of the inventive roof hatch, and with respect to the use of identical parts for the pushrods and the tilting devices, it is advantageous for the guideways to be arranged concentrically with respect to the rotational axis of the cam disk. To the same end, it is beneficial when the guideways have the same radii.

Advantageously, the roof hatch can be actuated by a control grip arranged at the cam disk. Alternatively thereto, a gear toothing is provided at the cam disk, which is engaged by a pinion of an electric motor. Actuation of the inventive roof hatch, advantageously, is such that, starting from a zero position, both an alternating, as well as a simultaneous tilting of the cover ends, connected with the tilting devices, can be controlled with a rotational angle of 180° of the cam disk.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
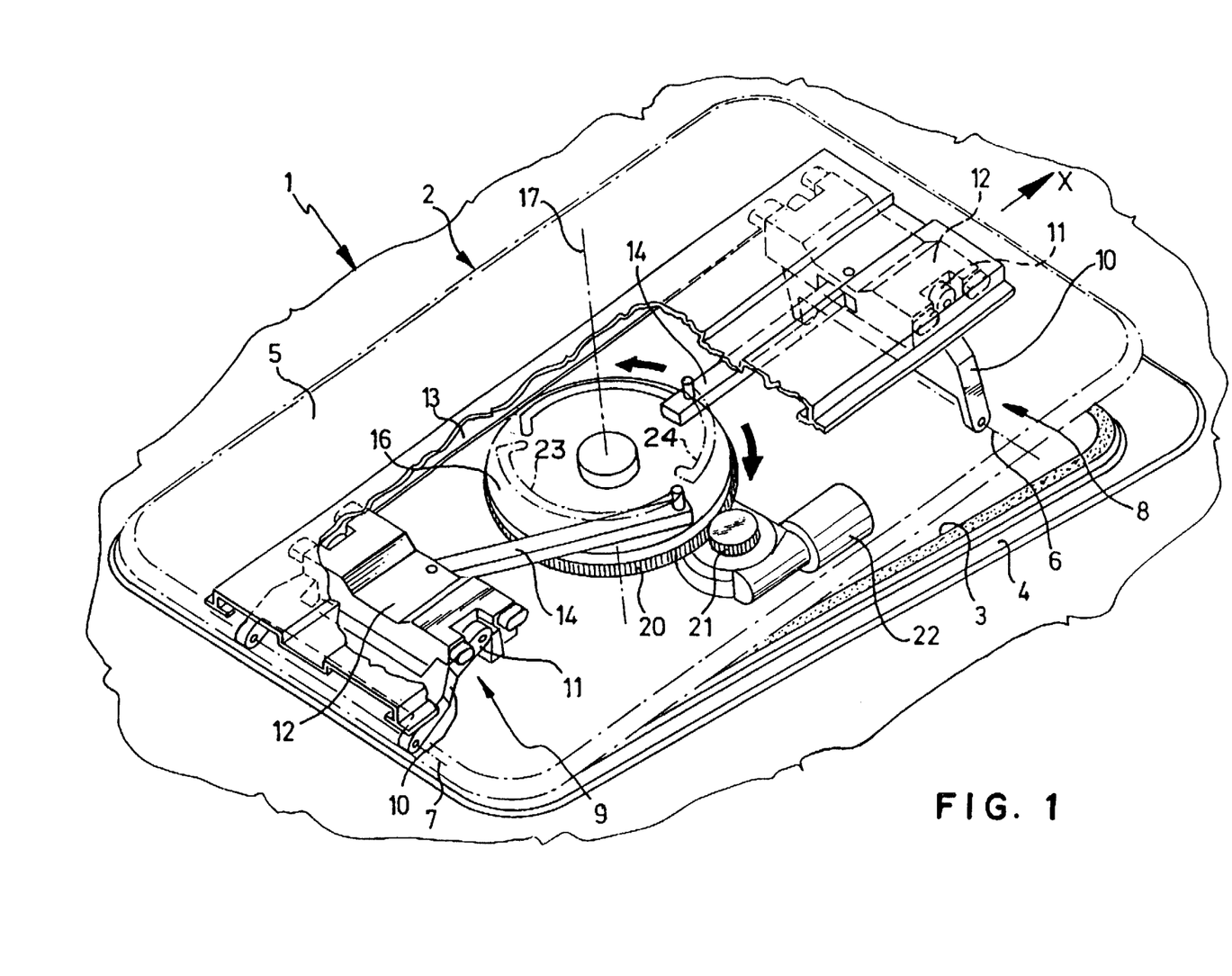
FIG. 1 is a schematic, perspective view of a roof hatch with the cover front edge tilted upward.

A roof hatch 2 is installed into a fixed vehicle roof 1, preferably the vehicle roof of a bus, is shown in FIG. 1. The inner edge of a frame 4 defines a roof opening 3 in fixed vehicle roof 1. The roof opening 3 is closed by cover 5 in its basic position.

For the purpose of obtaining various ventilating positions, cover 5, with respect to a forward vehicle driving direction X, is selectively tiltable to raise its front edge, as depicted in FIG. 1; or to raise its rear edge (i.e., the edge on the left in FIG. 1); or to, simultaneously, can be raised at both its front and rear ends. Tilting of the rear edge of cover 5 is caused by pivotal movement of a rear lifting lever 10 of a pivotable support 9 around an axis 7, while the tilting movement of the front edge of cover 5 is caused by pivotal movement of a front lifting lever 10 of pivotable support 8 around an axis 6. A first end of the lifting levers 10 of supports 8, 9 are pivotally connected to frame 4, e.g., via pins forming pivot axes 6, 7. The other end of the lifting levers 10 has a link 11 which is pivotally connected to a respective sliding element 12, which is disposed in a segment of a track 13 so as to be longitudinally movable in the drive direction X Each sliding element 12 is pivotally connected to one end of a pushrod 14, whose other end, on one hand, is in engagement with cam surfaces 18, 19 of a cam disk 16 via a pin 15, and on the other hand, is engaged with a guideway 23, 24, fixedly arranged at the inner side of cover 5. Cam disk 16 is rotationally secured to cover 5 for movement about a rotational axis 17. A first cam surface 18 on cam disk 16 consists only of a short section 18A, which has a radial as well as a tangential component with respect to rotational axis 17 of cam disk 16. Pin 15 of pushrod 14 engages this section 18A, which section serves to effect tilting of the cover's rear edge (in FIG. 1 to the left). Offset by about 90° with respect to first cam surface 18, (and relative to section 18A), a second cam surface 19 begins. Second cam surface 19 has an approximately quadrantal length with its end that is disposed opposite section 18A having section 19A that, likewise, extends inwardly with a tangential component and a radial component with respect to rotational axis 17. Pin 15 of the pushrod 14 used to actuate the cover's front edge (in FIG. 1, to the right) engages the second cam surface 19 or section 19A.

Pin 15 of the pushrod 14 which serves to actuate the cover's rear edge, in addition to engaging the section 18A, also engages guideway 23, which is fixedly arranged on the inner side of cover 5. This guideway 23 is approximately semicircular and is concentrically arranged with respect to rotational axis 17. At its inner edge, guideway 23 has a slightly larger radius than that of cam surface 19. In the center of the semicircular guideway 23, at the inner edge, there is a semicircular recess 23B, and at the lower end, depicted in FIG. 2, there is provided a short section 23A, which is radially inwardly directed. The center of the semicircular guideway 23, marked by recess 23B, lies on the longitudinal axis of cover 5, opening towards its rear edge. Likewise, concentrically with respect to the rotational axis 17, and with a radius identical to that of guideway 23, there is another guideway 24 at the inner side of the cover. Guideway 24 starts opposite radial section 23A (as viewed relative to rotational axis 17) with a, likewise, short section 24A, also directed radially inwardly towards rotational axis 17, and starting from there, the section 24A extends approximately up to the longitudinal axis of the cover in the direction of its front edge.

Figure 6:
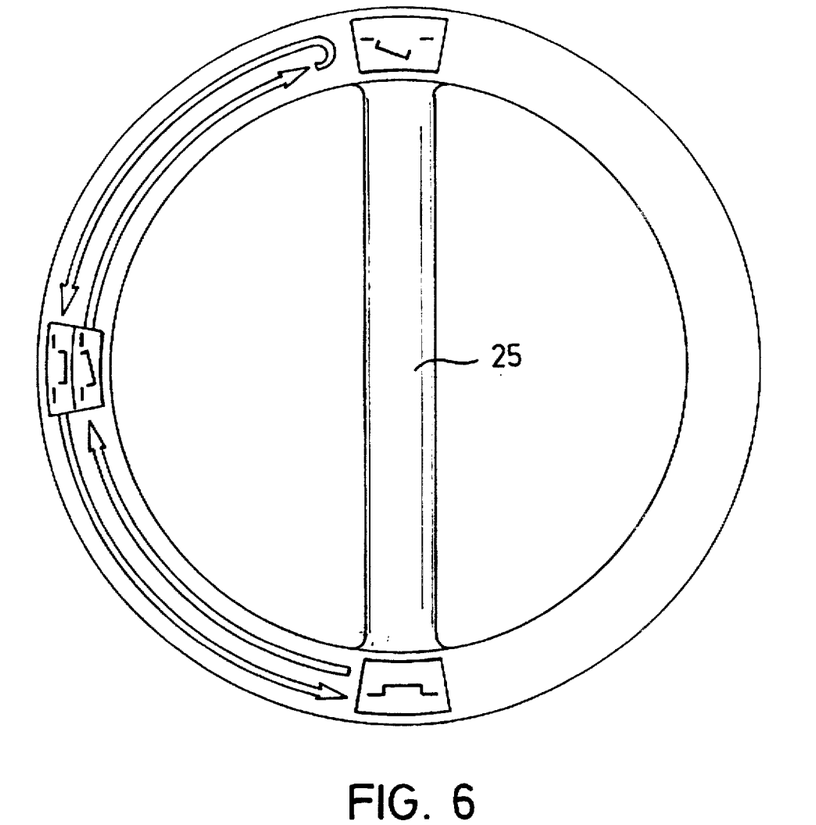
FIG. 6 is a schematic view of a manual operable, operating element.

For actuation of the cam disk 16, it can selectively be connected at the inner side of the passenger compartment, with either a control grip 25, depicted schematically in FIG. 6, or, as depicted in FIG. 1, at approximately half of its outer circumference, can have a gear toothing 20, which is engaged by a pinion 21 of an electric motor 22.

Figure 2:
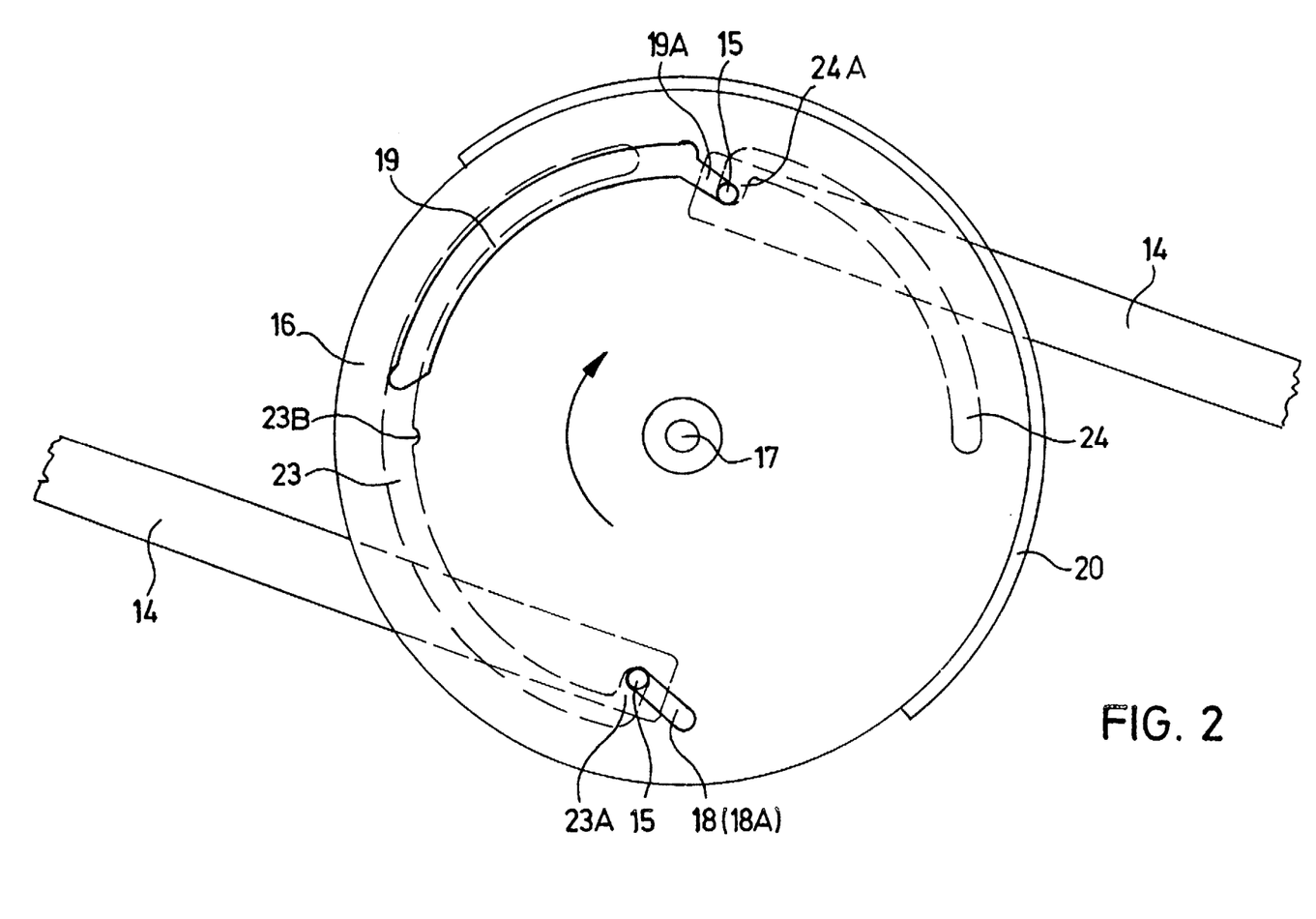
FIG. 2 is a schematic view of a cam disk and the push rods in a basic position, with the cover fully closed.

Starting from the basic position, schematically depicted in FIG. 2, in which both the rear edge as well as the front edge of cover 5 are lowered closing the roof opening 3, the following text describes the action of the cam surfaces and the guideways in connection with the pushrods 14, which actuate lifting levers 10.

In the FIG. 2 illustration, the pins 15 of both pushrods 14, are, respectively, at the inner ends of the radial sections 23A, 24A of the guideways 23, 24 which are fixed to the cover 5. At the same time, pins 15 contact the inner end of the segments 18A, 19A of cam disk 16, thereby ensuring firm locking of the pushrods in the basic position.

Figure 3:
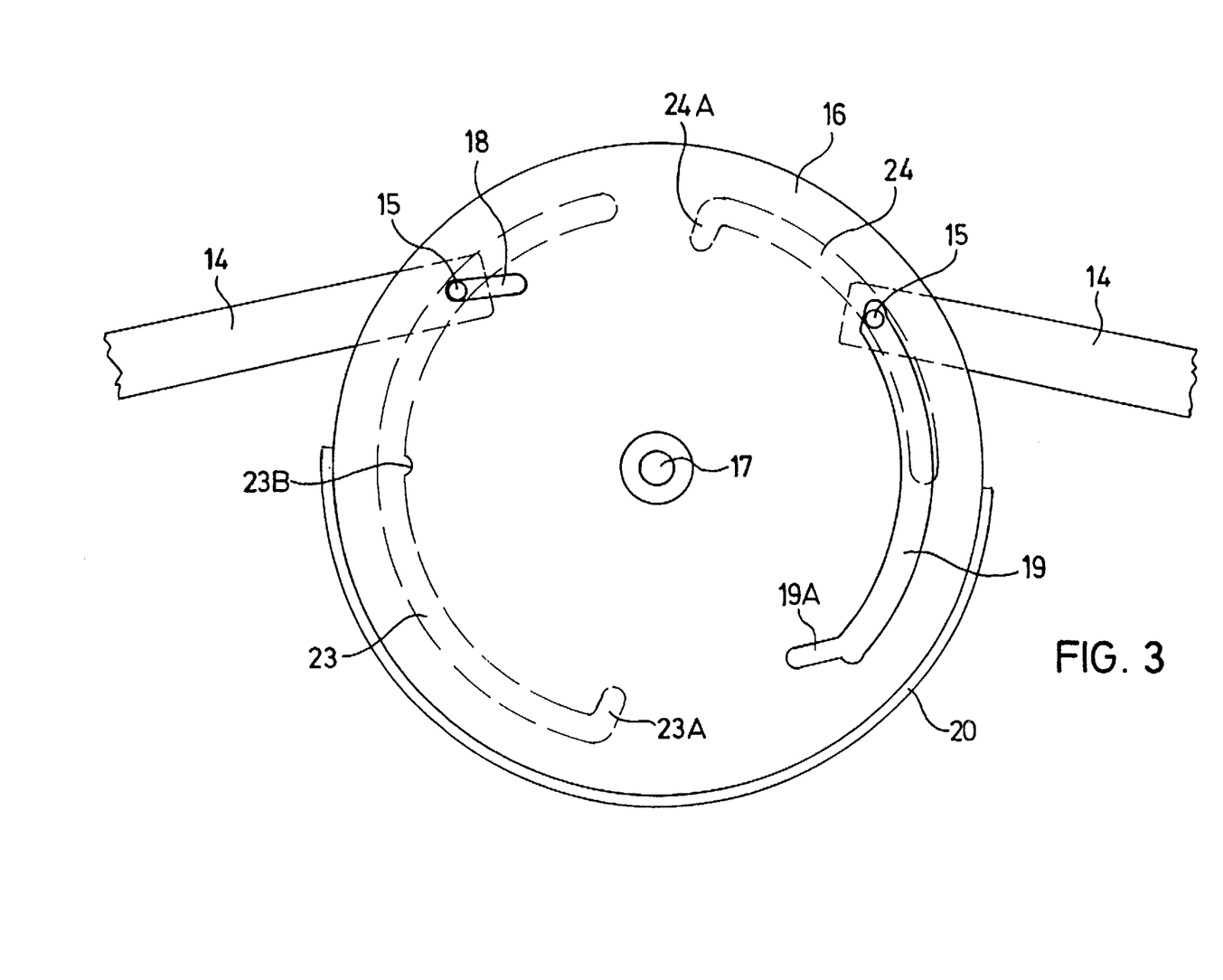
FIGS. 3–5 are views corresponding to that of FIG. 2 showing different movement phases of the cover.

For the purpose of initially tilting the rear edge of cover 5, starting from the FIG. 2 basic position, cam disk 16 is rotated by 900 ° clockwise in the direction of the arrow, which causes pins 15 to move outwardly along the inner flanks of sections 18A, 19A in the radial sections 23A, 24A. This outward radial movement eliminates the locking of the basic position. Subsequently, the outer end of section 18A takes the pin 15 which is disposed below in FIG. 2 along by a 90° movement, whereupon it reaches recess 23B. In this position, the rear pushrod 14 has been moved to the left by an amount which approximates the radius component of the guideway 23 and thereby has actuated the rear lifting lever 10 for lifting of the rear edge cover via sliding element 12 (i.e., to the left as depicted in FIG. 1). During this first 90° rotational movement, the front pushrod 14, which serves to effect tilting of the front cover edge, remains unchanged in its FIG. 2 position, facilitated by the fact that associated pin 15 remains stationary, because of cam surface 19 sliding past it in an idle movement. Recess 23B serves to secure the tilted position of the rear cover edge 5. In the event that wind forces are affecting the cover end, pin 15 of associated push rod 14 is pressed into this recess 23B. Further movement of pin 15 is only forcibly possible by a continued rotation of cam disk 16. Such rotational movement is further illustrated in FIG. 3. Section 18A has taken along pin 15, thereby serving to tilt the rear cover edge. With the further rotation of the cam disk 16 to the right, pin 15 is forced out of recess 23B, with simultaneous movement of pin 15 of the front pushrod 14, taken along by the rear end of cam surface 19, serving to tilt the front cover edge. In the movement depicted in FIG. 3, cover 5 closes itself at the rear edge, and simultaneously is tilted up at the front edge.

Figure 4:
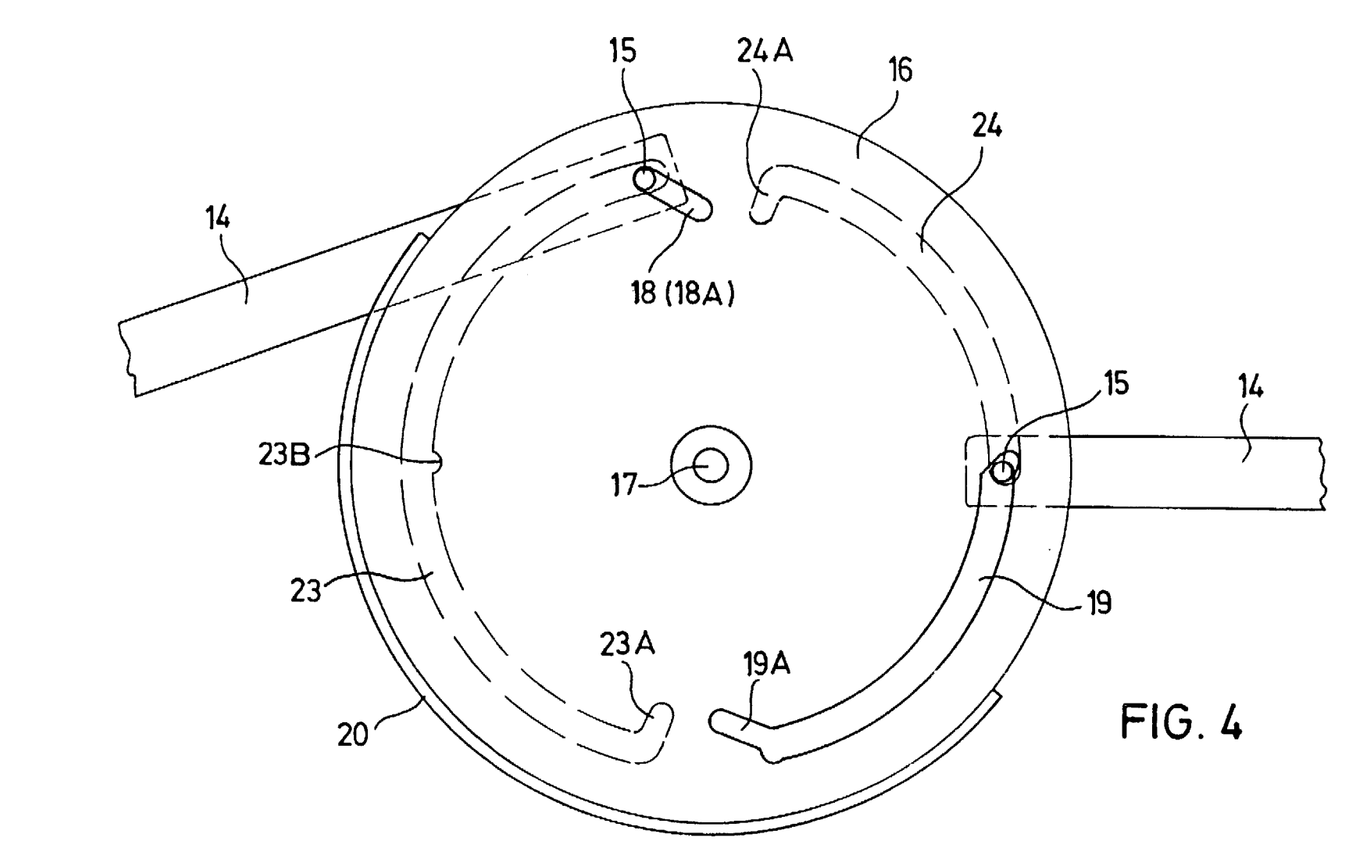

FIG. 4 illustrates a phase shortly before reaching a 180° position, in which the cover front end (depicted in FIG. 1 to the right) is tilted up, and the cover rear end (depicted to the left in FIG. 1) is lowered. To achieve locking in this position, the cam disk 16 must perform another slight clockwise rotation, after which further clockwise rotation is no longer possible. In fact, either actuating element (control grip 25 or the electric motor 22) must rotate cam disk 16 back by 90° (counterclockwise), whereby the front pin 15 serving to tilt the front cover edge, remains unchanged in its position because cam surface 19 slides past it in the form of an idle path. The rear pin 15, however, is taken along 90° to the left by the short cam surface 18, thereby again raising the rear edge cover 15 by way of its associated push rod 14.

Figure 5:
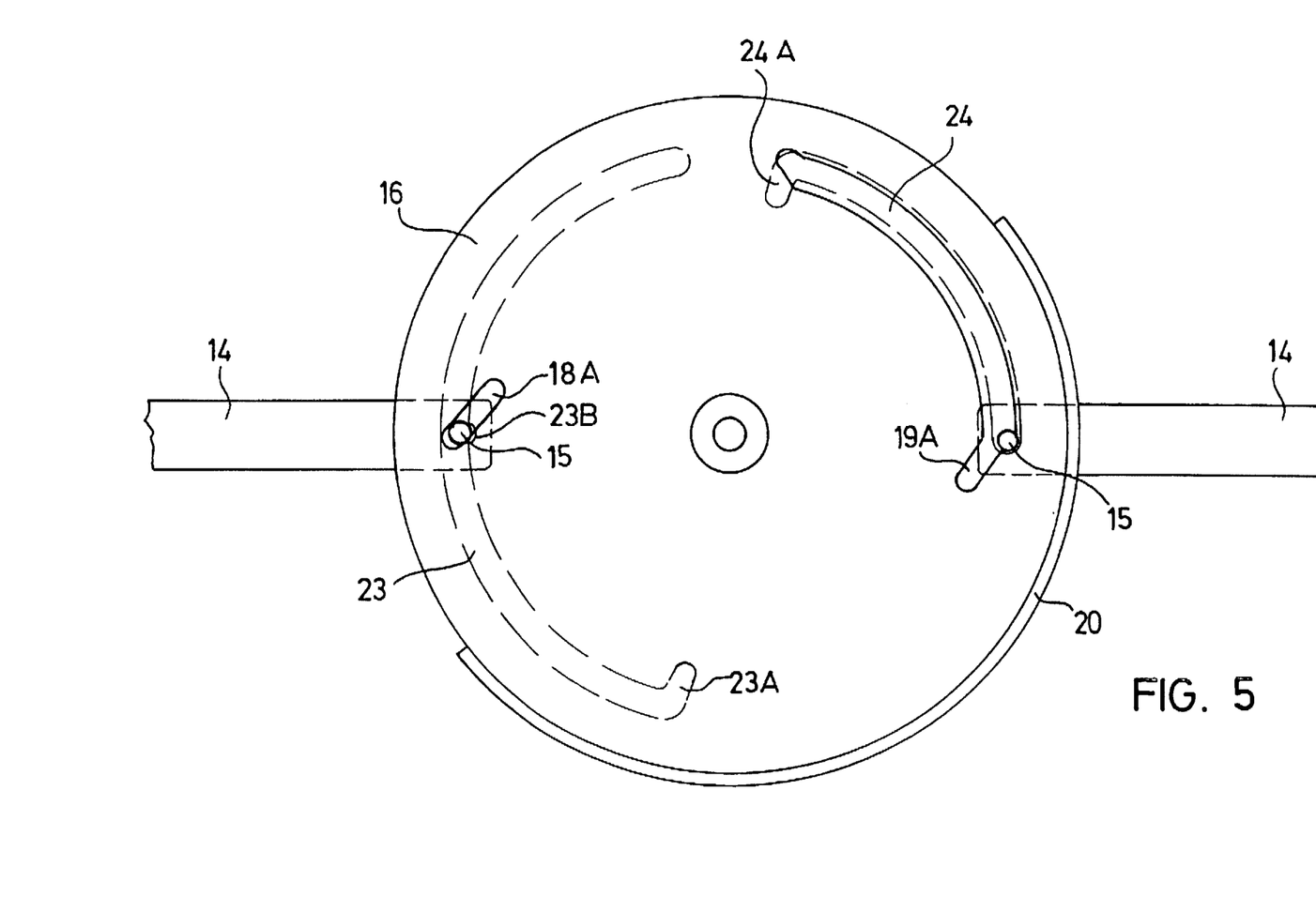

In the FIG. 5 position, cover 5, accordingly, is tilted up at both its front edge as well as at its rear edge into a ventilating position. A further counterclockwise rotation of the cam disk 16 by 90°, effects a return to the FIG. 2 starting position, whereby both pins 15, by action of the cam surfaces 18, 19, are rotated counterclockwise toward a transversely extending plane containing the axis 17. This causes lifting levers 10, connected with the associated pushrods 14, to effect a pivoting of the front and rear cover ends. In the end position, pins 15 are pressed into the radial segments 23A, 24A of guideways 23, 24 by segments 18A, 19A on cam disk 16, and consequently, into the locked position.

As can be clearly seen in FIG. 6, an alternate tilting from an initial zero position, first of the rear cover edge, and then of the front cover edge, occurs by a rotation angle of only 180°. In a counterclockwise return rotation by the same amount, the completely raised position of cover 5 is achieved at 90° before returning back to the zero position.

The actuating element 25, depicted in FIG. 6, by virtue of the low friction losses and low drive forces required by the mechanism described, is easy to operate, and, based on the markings provided, indicated by arrows and display symbols, affords ease of actuation as well.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A roof hatch for vehicle roofs, comprising a frame disposed in a fixed roof and having an inner edge which defines a roof opening, a cover for said roof opening, and tilting devices constituting a means for selectively opening and closing the cover; wherein the cover is supported at two opposite sides of the frame via a respective one of the tilting devices; wherein an actuating device is connected to the tilting devices which comprises a cam disk with at least two cam surfaces, said cam disk being rotatably supported for rotation about an axis, centrally at an underside of the cover, and pushrods, each of which extends between the cam disk and a respective one of the tilting devices; wherein a first end of each pushrod is pivotally supported at the respective one of the tilting devices and a second end of each pushrod being in engagement with a respective one of the cam surfaces and also being guided in a respective guideway which is fixed with respect to the cover: and wherein the respective guideway for one of the pushrods is approximately semicircular, and the respective guideway for the other pushrod is approximately quadrantal.

2. Roof hatch according to claim 1, wherein an end of a first of the guideways is disposed opposite an end of a second of the guideways, said ends each having a segment which is directed radially inwardly with respect to the axis of rotation of the cam disk.

3. A roof hatch for vehicle roofs, comprising a frame disposed in a fixed roof and having an inner edge which defines a roof opening, a cover for said roof opening, and tilting devices constituting a means for selectively opening and closing the cover, wherein the cover is supported at two opposite-sides of the frame via a respective one of the tilting devices: wherein an actuating device is connected to the tilting devices which comprises a cam disk with at least two cam surfaces, said cam disk being rotatably supported for rotation about an axis, centrally at an underside of the cover, and pushrods. each of which extends between the cam disk and a respective one of the tilting devices, wherein a first end of each pushrod is pivotally supported at the respective one of the tilting devices and a second end of each pushrod being in engagement with a respective one of the cam surfaces and also being guided in a respective guideway which is fixed with respect to the cover, and wherein an end of a first of the guideways is disposed opposite an end of a second of the guideways, said ends each having a segment which is directed radially inwardly with respect to the axis of rotation of the cam disk.

4. Roof hatch according to claim 3, wherein an end of a first of the cam surfaces is disposed opposite an end of a second of the cam surfaces, said ends each comprising a section having a length with radially and tangentially directed vector components with respect to the axis of rotation of the cam disk, the length of the radially directed vector component being substantially equal to a radial length of said segments of the guideways.

5. Roof hatch according to claim 4, wherein one of the cam surfaces consists of only said section having the radially and tangentially directed vector component, the other of the cam surfaces has an additional part which is approximately quadrantal.

6. A roof hatch for vehicle roofs, comprising a frame disposed in a fixed roof and having an inner edge which defines a roof opening, a cover for said roof opening, and tilting devices constituting a means for selectively opening and closing the cover: wherein the cover is supported at two opposite sides of the frame via a respective one of the tilting devices; wherein an actuating device is connected to the tilting devices which comprises a cam disk with at least two cam surfaces, said cam disk being rotatably supported for rotation about an axis, centrally at an underside of the cover, and pushrods. each of which extends between the cam disk and a respective one of the tilting devices: wherein a first end of each pushrod is pivotally supported at the respective one of the tilting devices and a second end of each pushrod being in engagement with a respective one of the cam surfaces and also being guided in a respective guideway which is fixed with respect to the cover: and wherein said guideways are arranged concentrically with respect to the axis of rotation of the cam disk.

7. Roof hatch according to claim 6, wherein the guideways have the same radii.

8. Roof hatch according to claim 1, wherein a control grip is connected to the cam disk for manual rotation thereof.

9. Roof hatch according to claim 8, wherein the cam disk is provided with a toothed gearing which is engaged by a pinion of an electric motor for rotation thereof.

10. Roof hatch according to claim 1, wherein the cam disk is provided with a toothed gearing which is engaged by a pinion of an electric motor for rotation thereof.

11. A roof hatch for vehicle roofs, comprising a frame disposed in a fixed roof and having an inner edge which defines a roof opening, a cover for said roof opening, and tilting devices constituting a means for selectively opening and closing the cover, wherein the cover is supported at two opposite sides of the frame via a respective one of the tilting devices: wherein an actuating device is connected to the tilting devices which comprises a cam disk with at least two cam surfaces. said cam disk being rotatably supported for rotation about an axis, centrally at an underside of the cover, and pushrods, each of which extends between the cam disk and a respective one of the tilting devices: wherein a first end of each pushrod is pivotally supported at the respective one of the tilting devices and a second end of each pushrod being in engagement with a respective one of the cam surfaces and also being guided in a respective guideway which is fixed with respect to the cover: and wherein said actuating device forms a means for producing an both an alternate as well as a simultaneous tilting of the cover ends connected with the tilting devices within a rotational angle of movement of the cam disk of 180°.

12. Roof hatch according to claim 11, wherein an end of a first of the guideways is disposed opposite an end of a second of the guideways, said ends each having a segment which is directed radially inwardly with respect to the axis of rotation of the cam disk.

13. Roof hatch according to claim 12, wherein an end of a first of the cam surfaces is disposed opposite an end of a second of the cam surfaces, said ends each comprising a section having a length with radially and tangentially directed vector components with respect to the axis of rotation of the cam disk, the length of the radially directed vector component being substantially equal to a radial length of said segments of the guideways.

14. Roof hatch according to claim 13, wherein one of the cam surfaces consists of only said section having the radially and tangentially directed vector component, the other of the cam surfaces has an additional part which is approximately quadrantal.

15. Roof hatch according to claim 11, wherein a control grip is connected to the cam disk for manual rotation thereof.

16. Roof hatch according to claim 11, wherein the cam disk is provided with a toothed gearing which is engaged by a pinion of an electric motor for rotation thereof.

* * * * *